March 14, 1944.　　　L. S. CURTIN　　　2,343,960
TRIMMING MACHINE
Filed Nov. 10, 1942　　　2 Sheets-Sheet 1

Patented Mar. 14, 1944

2,343,960

UNITED STATES PATENT OFFICE 2,343,960

TRIMMING MACHINE

Leonard S. Curtin, Belmont, Mass., assignor to United Shoe Machinery Corporation, Flemington, N. J., a corporation of New Jersey Application November 10, 1942, Serial No. 465,127

10 Claims. (Cl. 12—1)

The object of the present invention is to provide an improved trimming machine capable of severing surplus material from a seam formed by margins of flexible sheet material lying face to face and edge to edge and connected by a row of stitches.

A typical example of such a seam as used in shoemaking is the so-called moccasin seam at the junction of the vamp and plug of a moccasin. According to present practice, the inner surfaces at the meeting edges of a moccasin vamp and plug are first beveled, the bevel surfaces are coated with cement, laid face to face and, finally, the parts are connected by a row of stitches located at the base of the bevels. This produces a seam of V-section. The margin outside the stitch line in a seam of this type is commonly too wide to present or preserve a neat appearance, and for that reason the general practice is to trim it on a line about one-sixteenth inch outside the stitch line. Such trimming has been done heretofore by hand because no machine suitable for the purpose has been available, but hand work is slow, laborious and usually uneven. Moreover, the cuts frequently run too close to the stitches.

The invention herein shown and described is embodied in a trimming machine comprising a power-operated cutter and means for guiding and constraining a seam of the specified type to maintain the line of trimming at a uniform distance from the stitch line, even though the work be fed manually.

A novel feature of the guiding means consists in a pair of fixed elements having opposed surfaces arranged to form a work-guiding trough and to engage the outer surfaces of the seam adjacent to the cutting locality and thereby brace the seam against sidewise displacement. The trough thus formed is preferably one of V-section to mate the sectional shape of the seam.

If, as herein shown, the cutter is of the type that remains in the work throughout a trimming operation and executes a draw cut, its bevel or ground surface back of the cutting edge will preferably be located on the side toward the crotch of the trough to draw the work into the crotch, but the work may be otherwise constrained toward the crotch by a supplemental work-guiding member arranged to project into the crease of the seam, particularly if the mouth of the trough is at the bottom. In the latter case the supplemental work-guiding member will support the weight of the work and the seam will travel over the top of it and afford the operator a view of the trimmed surface as the work emerges from one end of the trough.

Referring to the drawings.

Figure 1:
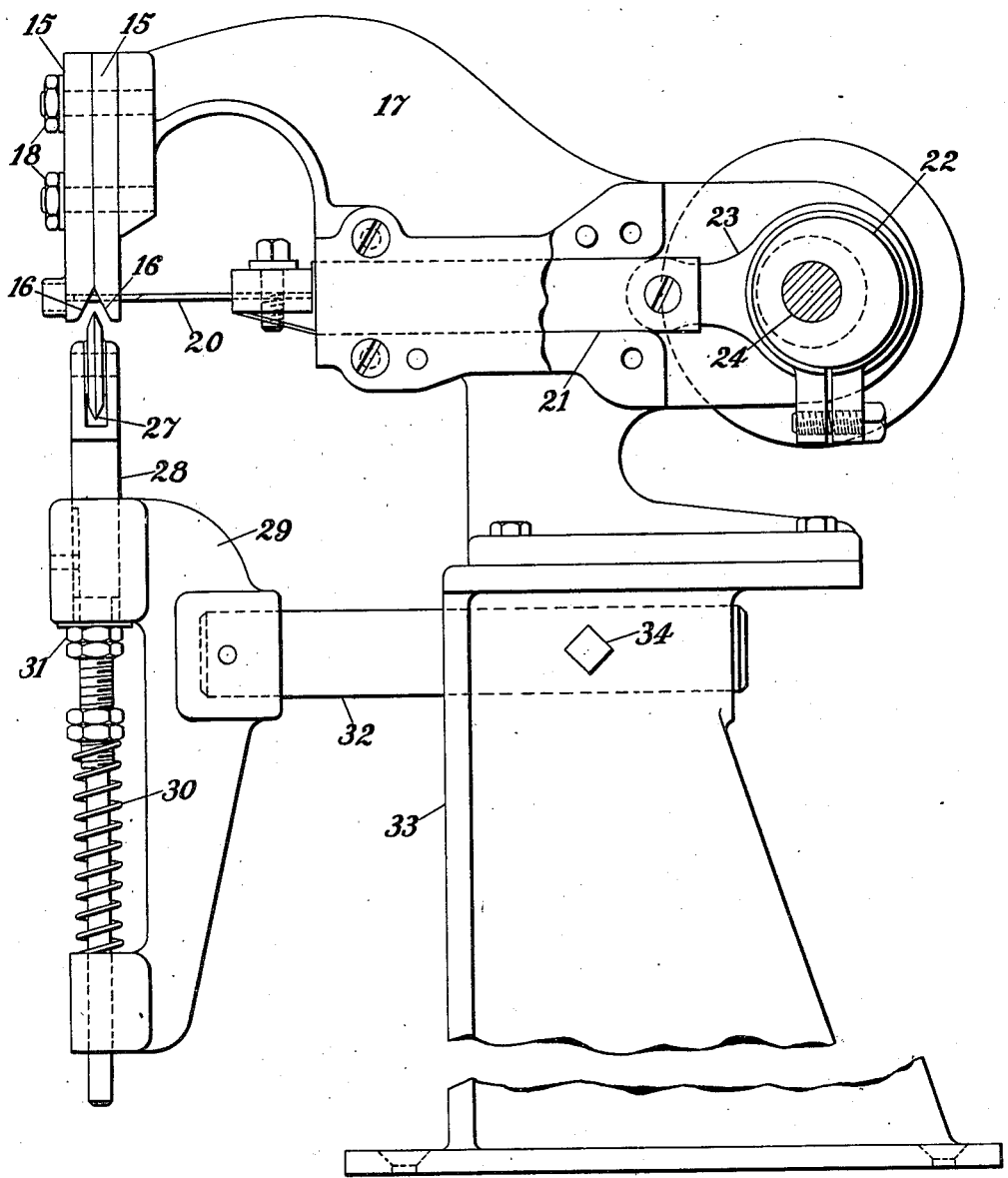
Fig. 1 is an elevation, partly broken away, of a trimming machine embodying the invention.
Figure 2:
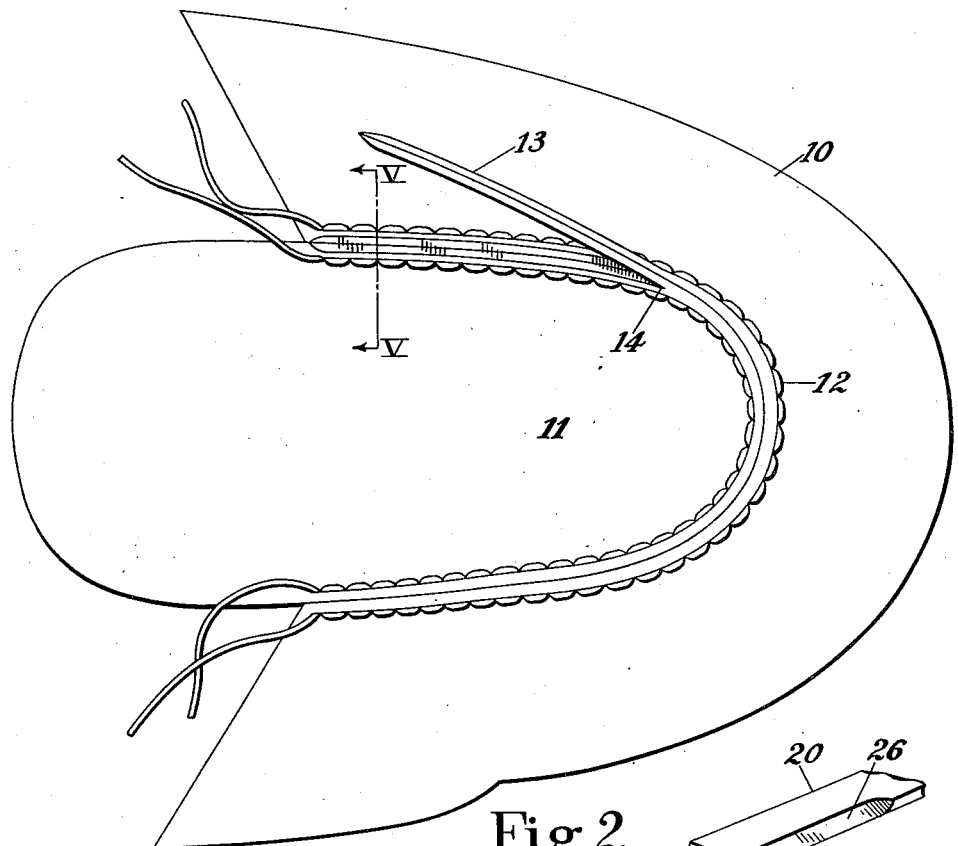
Fig. 2 is a plan view of a typical specimen of work comprising a moccasin vamp and plug connected by a stitched seam.
Figure 6:
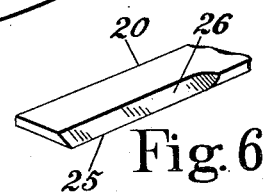
Fig. 6 is a perspective view of the cutting portion of the trimming blade.
Figure 3:
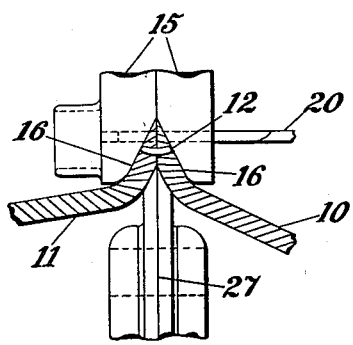
Fig. 3 illustrates a portion of a work piece in section and on a larger scale in the trough or channel formed by the work-guiding elements of the machine.
Figure 4:
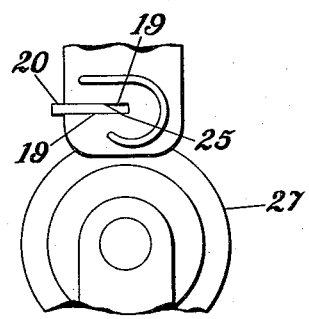
Fig. 4 is a front elevation of the machine elements included in Fig. 3.
Figure 5:
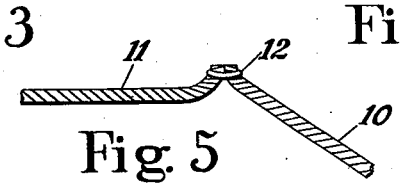
Fig. 5 is a cross section of a trimmed seam (see line V—V in Fig. 2)

The specimen of work shown in Fig. 2 comprises a vamp 10 and a plug 11 intended for a moccasin type shoe. The inner surfaces of the margins to be joined are first beveled, the bevel surfaces thereof coated with cement, laid face to face and connected by a row of stitches 12 to form a seam of V-section (Fig. 3). To provide a strong seam the stitches are located at the base of the bevels, but their location provides more than the desired width of margin outside the stitch line. The problem with which the present invention is concerned is to trim this margin on a line about one-sixteenth inch outside the stitch line. Fig. 2 represents the work piece as having been partially trimmed and the partially severed strip 13 of surplus material still connected to it at the point 14 where the trimming was interrupted.

The trimming machine is provided with fixed work-guiding means comprising a pair of elements 15, 15 having oppositely inclined work-engaging surfaces 16, 16 forming a trough of inverted V-section to receive the seam. The trough is preferably arranged to place its mouth at the bottom and its crotch at the top for the reason that the seam is thereby enabled to stand up above the rest of the work piece to place the surplus material above the stitches and to enable the operator to view the newly trimmed surface of the seam from above as the work emerges from the delivery end of the trough.

The elements 15, 15 are affixed to the frame 17 by bolts and nuts 18. They are provided with horizontal kerfs that intersect the surfaces 16, 16 at a level slightly below the crotch of the trough, the confronting faces 19 of the kerfs being spaced to serve as bearing surfaces for a flat cutting blade 20. The blade is affixed to a reciprocatory bar 21 to which motion is imparted by an eccentric 22 and a connecting strap 23. Bearings are provided in the frame for the bar 21 and for a power-driven operating shaft 24 by which the eccentric is carried.

The cutting edge 25 of the blade extends lengthwise of its path of travel to execute a draw cut and is arranged to bridge the trough in which the seam travels. Moreover, the inclined or bevel face 26 back of the cutting edge is located on the side of the blade that faces the crotch of the trough. Consequently, as the severed strip 13 rides this inclined face it constrains the work piece toward the crotch. In operation some portion of the cutting edge always bridges the gap between the guiding surfaces 16, 16, and as the blade moves to and fro these surfaces serve alternately to brace the seam against sidewise displacement. At the same time the faces 19 of the kerfs brace the blade against deflection depthwise of the trough.

A supplemental work-guiding member is provided to insure maintenance of the edge of the seam in the crotch of the trough instead of relying wholly upon the inclined face 26 of the blade or the operator's steadiness of hand. This supplemental member is preferably a freely rotatable roll the perimeter of which is a thin concentric ridge 27 adapted to roll in the crease of the seam inside the stitch line. The ridge is preferably one of V-section to mate the V-section of the trough. The roll is mounted in a post 28 arranged to move up and down in bearings in a stationary bracket 29. A segment of the ridge 27 is located between the guiding surfaces 16, 16 and adjacent to the cutting locality. A compression spring 30 surrounding the post constrains the roll toward the crotch but a nut 31 on a threaded portion of the post is arranged to abut a portion of the bracket to keep the roll out of contact with the surfaces 16, 16 when no work is in the trough. The nut may be adjusted to regulate the width of the work-receiving gap to a dimension slightly less than the thickness of the materials connected by the seam.

To provide for locating the median plane of the ridge 27 midway between the surfaces 16, 16 the bracket 29 is provided with a cylindrical stem 32 capable of being adjusted endwise in a socket in a supporting base 33 and fastened by a set screw 34. This feature also provides for rocking the stem about its axis to adjust the roll lengthwise of the trough.

To perform a trimming operation the operator will insert one end of the seam into the trough and feed the work manually. The work-supporting effect of the roll due to the force of the spring 30 is sufficient to maintain the outer surfaces of the seam against the guiding surfaces 16, 16 without developing so much friction as to impede the feeding in an objectionable degree.

A straight ridge and a long trough would serve the purposes of a straight seam, but the seam at the toe of a moccasin has a curve of short radius which requires turning the work as it progresses. For this reason the work-guiding trough must be short and the ridge 27 must also be designed to avoid obstructing the turning movement. This problem is solved by forming the ridge as though it were made of two conical frustra arranged base to base.

Having thus described my invention, what I claim as new and desire to secure by Letters Patent of the United States is:

1. A trimming machine comprising work-guiding means having oppositely inclined guiding surfaces forming a trough and arranged to engage respectively two margins of sheet material forming a seam of V-section, a supplemental work-guiding member having a ridge located between said guiding surfaces to project into the crease of the seam and maintain the latter against said surfaces, and power-operated cutting means arranged to sever surplus material from the edge of the seam between the guiding surfaces.

2. A trimming machine as specified in claim 1 in which the supplemental member is a roll having a concentric peripheral ridge, a segment of which is arranged to project into the crease of the seam.

3. A trimming machine as specified in claim 1 in which the supplemental member is movable and spring-loaded to press the seam into the trough.

4. A trimming machine comprising fixed work-guiding means having oppositely inclined work-engaging surfaces forming a trough of V-section and also having a kerf intersecting both of said surfaces in a plane parallel with the crotch of the trough but spaced from the crotch, a flat blade having parallel faces engaging confronting faces of the kerf and also having a cutting edge bridging the trough and a bevel face arranged to draw the work toward the crotch, and power-operated means for reciprocating the blade crosswise of the trough.

5. A trimming machine comprising a work-supporting member having a work-supporting ridge arranged to project into the crease of a seam formed by two upstanding margins of flexible material connected by a row of stitches, holddown means having opposed surfaces arranged to engage the outer surfaces of the seam on said ridge to brace the seam against sidewise displacement, and power-operated cutting means arranged to sever surplus material from the seam lying on said ridge.

6. A trimming machine as specified in claim 5 in which the holddown means is fixed and the work-supporting member is spring-loaded and arranged to yield downwardly.

7. A trimming machine comprising a pair of fixed holddowns arranged side by side and having oppositely inclined inside work-engaging surfaces forming a trough of inverted V-section, a vertically movable work-supporting member having oppositely inclined outside surfaces forming a ridge of inverted V-section located in said trough to engage the crease formed by two upstanding margins of flexible sheet material connected by a row of stitches, a spring by which said work-supporting member is normally raised to press the work against the surfaces of the trough, means arranged to maintain the work-supporting member away from said surfaces when no work is between them, and power-operated cutting means arranged to sever said margins above the stitches connecting them.

8. A trimming machine comprising fixed work-guiding means having oppositely inclined work-engaging surfaces forming a trough of inverted V-section and also having a transverse kerf intersecting said surfaces below the crotch of the trough, a work-supporting member having a work-supporting ridge located in said trough to be straddled by two upstanding margins of flexible sheet material connected by a row of stitches, a cutter located in said kerf and having a cutting edge bridging the trough, and power-operated means for actuating said cutter to execute a draw cut.

9. A trimming machine comprising fixed work-guiding means having oppositely inclined work-engaging surfaces forming a trough of inverted V-section and also having a transverse kerf intersecting said surfaces below the crotch of the trough, work-supporting means including a freely rotatable roll and a holder therefor, the roll having a perimeter of V-section mating said trough, a spring by which the holder is normally raised to press the work against said inclined surfaces, a flat blade engaging confronting surfaces of said kerf and having a cutting edge bridging the trough, and power-operated means for reciprocating the blade.

10. A trimming machine comprising a work-engaging member formed to be straddled by two stitched margins of work forming a seam of V-section and arranged to lie in the crease of the seam, fixed work-guiding means having oppositely inclined work-engaging surfaces forming a trough of V-section and arranged to brace the seam against lateral displacement, and power-operated cutting means arranged to sever surplus seam material in the crotch of the trough.

LEONARD S. CURTIN.